(12) United States Patent
Cheng et al.

(10) Patent No.: US 7,317,277 B2
(45) Date of Patent: Jan. 8, 2008

(54) ELECTRON FIELD EMITTER AND COMPOSITIONS RELATED THERETO

(75) Inventors: Lap-Tak Andrew Cheng, Newark, DE (US); David Herbert Roach, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/421,107

(22) Filed: Apr. 23, 2003

(65) Prior Publication Data

US 2004/0017141 A1 Jan. 29, 2004

Related U.S. Application Data

(60) Provisional application No. 60/375,206, filed on Apr. 24, 2002.

(51) Int. Cl.
 H01J 1/30 (2006.01)
 H01J 1/304 (2006.01)
 H01J 9/00 (2006.01)

(52) U.S. Cl. .................. 313/311; 313/309; 313/310; 313/351; 445/50; 445/51; 977/742; 977/745

(58) Field of Classification Search ........ 313/309–311, 313/346 R, 351, 336; 445/49–51
See application file for complete search history.

(56) References Cited

U.S. PATENT DOCUMENTS

| | | | |
|---|---|---|---|
| 4,857,799 A | | 8/1989 | Spindt et al. |
| 5,015,912 A | | 5/1991 | Spindt et al. |
| 5,149,584 A | | 9/1992 | Baker et al. |
| 5,264,404 A | * | 11/1993 | Takahama et al. ............. 502/5 |
| 5,413,866 A | | 5/1995 | Baker et al. |
| 5,458,784 A | | 10/1995 | Baker et al. |
| 5,463,271 A | * | 10/1995 | Geis et al. ............. 313/346 R |
| 5,618,875 A | | 4/1997 | Baker et al. |
| 5,885,728 A | * | 3/1999 | Mercuri et al. ............. 428/408 |
| 6,100,628 A | * | 8/2000 | Coll et al. .................. 313/310 |
| 6,239,547 B1 | * | 5/2001 | Uemura et al. ............. 313/495 |
| 6,798,127 B2 | * | 9/2004 | Mao et al. .................. 313/311 |
| 2001/0025962 A1 | | 10/2001 | Nakamoto |
| 2002/0061397 A1 | * | 5/2002 | Iwamura et al. ............ 428/334 |

FOREIGN PATENT DOCUMENTS

| | | | |
|---|---|---|---|
| EP | | 647688 A2 * | 4/1995 |
| EP | | 1 315 191 A2 | 5/2003 |
| JP | | 09259737 A * | 10/1997 |
| WO | | WO94/15352 | 7/1994 |
| WO | | WO94/28571 | 12/1994 |
| WO | | WO 01/99146 A2 | 12/2001 |
| WO | | WO 200273646 A2 * | 9/2002 |
| WO | | WO 01/99146 | 12/2003 |

OTHER PUBLICATIONS

W. B. Choi, D. S. Chung, J. H. Kang, H. Y. Kim, Y. W. Jin, I. T. Han, Y. H. Lee, J. E. Jung, N. S. Lee, G. S. Park and M. Kim, Fully sealed, high-brightness carbon-nanotube field-emission display, Applied Physics Letters, V. 75, No. 20, 1999, 3129-3131.
N. M. Rodriguez, A review of catalytically grown carbon nanofibers, J. Mater. Res., vol. 8, No. 12, 1993, 3233-3250.
N. M. Rodriguez, M. S. Kim and R. T. K. Baker, Promotional Effect of Carbon Monoxide on the Decomposition of Ethylene over an Iron Catalyst, Journal of Catalysis, 144, 93-108, 1993.
B. H. Frisbine, C. J. Miglionico, K. E. Hackett, K. J. Hendricks, X. K. Wang, R. P. H. Chang, J. D. Shovlin, and M. E. Kordesch, Buckytube Cold Field Emittter Array Cathode Experiments, Mat. Res. Soc. Symp. Proc., vol. 359, 1995, 93-98.
Leonld Chemozatonskii et al., Nanotube Carbon Structure Tips—A Source of High Field Emission of Electrons, Mat. Res. Soc. Symp. Proc. vol. 359, 1995, 99-104.
A. G. Rinzler, J. H. Hafner, P. Nikoleev, L. Lou, S. G. Kim, D. Tomanek, P. Nordiander, d. T. Colbert and R. E. Smalley, Unraveling Nanotubes: Field Emission from an Atomic Wire, Science, vol. 269, 1995, 1550-1553.
D. S. Chung, W. B. Choi, J. H. Kang, I. T. Han, Y. S. Park, Y. H. Lee, J. E. Jung and J. M. Kim, Field emission from 4.5 in. single-walled and multiwalled carbon nanotube films, J. Vac. Sci. Technol., B 18(2), 2000, 1054-1058.
L. A. Chemozatonskii et al., Electron field from nanofilament carbon films, Chemical Physics letters, 233, 1995, 63-88.
Minfang Zhang et. al., Single-Wall Carbon Nanotubes: A High Yield of Tubes Through Laser Ablation of a Crude-Tube Target, Chemical Physics Letters, 2001, pp. 198-200, vol. 336.
Hirofumi Takikawa et. al., Carbon Nanotubes in Cathodic Vacuum are Discharge, J. Phys. D: Appl. Phys., 2000, pp. 826-830, vol. 33.
L. Duclaux et. al., Intercalation of Heavy Alkali Metals (K, Rb and C's) in the Bundles of Single Wall Nanotubes, Electronic Properties of Novel Materials, 2000, pp. 408-411.

* cited by examiner

*Primary Examiner*—Mariceli Santiago

(57) ABSTRACT

This invention provides compositions of matter that contain an electron emitting substance and an expansion material. The expansion material may, for example, be an intercalation compound. When a film is formed from the composition, expansion of the expansion material typically causes rupturing or fracturing of the film. No further treatment of the surface of the film is typically required after expansion of the expansion material to obtain good emission properties. A surface formed from such a fractured film acts as an efficient electron field emitter and thus is useful in vacuum microelectronic devices.

26 Claims, 3 Drawing Sheets a b c

ELECTRON FIELD EMITTER AND COMPOSITIONS RELATED THERETO

This application claims the benefit of U.S. Provisional Application No. 60/375,206, filed Apr. 24, 2002, which is incorporated in its entirety as a part hereof for all purposes.

FIELD OF THE INVENTION

This invention relates to compositions of matter that are efficient electron field emitters. In particular the invention relates to electron field emitters that contain an electron emitting substance and an expansion material. Further the invention relates to a process of making an electron field emitter by expanding an expansion material.

BACKGROUND OF THE INVENTION

Field emission electron sources, often referred to as field emission materials or field emitters, can be used in a variety of electronic applications, e.g., vacuum electronic devices, flat panel computer and television displays, emission gate amplifiers, and klystrons and in lighting.

Display screens are used in a wide variety of applications such as home and commercial televisions, laptop and desktop computers and indoor and outdoor advertising and information presentations. Flat panel displays can be an inch or less in thickness in contrast to the deep cathode ray tube monitors found on most televisions and desktop computers. Flat panel displays are a necessity for laptop computers, but also provide advantages in weight and size for many of the other applications. Currently laptop computer flat panel displays use liquid crystals, which can be switched from a transparent state to an opaque state by the application of small electrical signals. It is difficult to reliably produce these displays in sizes larger than that suitable for a laptop computer.

Plasma displays have been proposed as an alternative to liquid crystal displays. A plasma display uses tiny pixel cells of electrically charged gases to produce an image, and its operation requires a relatively large amount of electrical power.

Flat panel displays having a cathode that uses a field emission electron source, i.e., a field emission material or field emitter, and a phosphor capable of emitting light upon bombardment by electrons emitted by the field emitter, have been proposed. Such displays have the potential for providing the visual display advantages of the conventional cathode ray tube and the depth, weight and power consumption advantages of the other flat panel displays. U.S. Pat. Nos. 4,857,799 and 5,015,912 disclose matrix-addressed flat panel displays using micro-tip cathodes constructed of tungsten, molybdenum or silicon. WO 94/15352, WO 94/15350 and WO 94/28571 disclose flat panel displays wherein the cathodes have relatively flat emission surfaces.

Field emission has been observed in two kinds of nanotube carbon structures. L. A. Chernozatonskii et al [*Chem. Phys. Letters* 233, 63 (1995) and *Mat. Res. Soc. Symp. Proc.* Vol. 359, 99 (1995)] have produced films of nanotube carbon structures on various substrates by the electron evaporation of graphite in $10^{-5} \sim 10^{-6}$ torr. These films consist of aligned tube-like carbon molecules standing next to one another. Two types of tube-like molecules are formed: (1) the A-tubelites, whose structure includes single-layer graphite-like tubules forming filaments-bundles 10–30 nm in diameter; and (2) the B-tubelites, including mostly multilayer graphite-like tubes 10–30 nm in diameter with conoid or dome-like caps. The authors report considerable field electron emission from the surface of these structures and attribute it to the high concentration of the field at the nanodimensional tips.

B. H. Fishbine et al [*Mat. Res. Soc. Symp. Proc.* Vol. 359, 93 (1995)] discuss experiments and theory directed towards the development of a buckytube (i.e., a carbon nanotube) cold field emitter array cathode. A. G. Rinzler et al [*Science* 269, 1550 (1995)] report the field emission from carbon nanotubes is enhanced when the nanotubes tips are opened by laser evaporation or oxidative etching.

W. B. Choi et al [*Appl. Phys. Lett.* 75, 3129 (1999)] and D. S. Chung et al [*J. Vac. Sci. Technol.* B 18(2)] report the fabrication of a 4.5 inch flat panel field display using single-wall carbon nanotubes-organic binders. The single-wall carbon nanotubes were vertically aligned by squeezing paste through a metal mesh, by surface rubbing and/or by conditioning by electric field. The authors also prepared multi-wall carbon nanotube displays. It was noted that carbon nanotube field emitters having good uniformity were developed using a slurry squeezing and surface rubbing technique. Further, it was found that removing metal powder from the uppermost surface of the emitter and aligning the carbon nanotubes by surface treatment enhanced the emission. Single-wall carbon nanotubes were found to have better emission properties than multi-wall carbon nanotubes, but single-wall carbon nanotube films showed less emission stability than multi-wall carbon nanotube films.

Zettl et al (U.S. Pat. No. 6,057,637) disclose a field emitter material comprising a volume of binder and a volume of $B_xC_yN_z$ nanotubes suspended in the binder, where x, y and z indicate the relative ratios of boron, carbon and nitrogen.

WO 01/99146 discloses a method of improving the field emission of an electron field emitter that may be made from an acicular emitting substance.

N. M. Rodriguez et al [*J. Catal.* 144, 93 (1993)] and N. M. Rodriguez [*J. Mater. Res.* 8, 3233 (1993)] discuss the growth and properties of carbon fibers produced by the catalytic decomposition of certain hydrocarbons on small metal particles. U.S. Pat. Nos. 5,149,584, U.S. 5,413,866, U.S. 5,458,784, U.S. 5,618,875 and U.S. 5,653,951 disclose uses for such fibers.

Despite disclosures in the art such as those discussed above, there is a continuing need for technology enabling the commercial use of electron emitting substances, particularly acicular carbon, in electron field emitters.

SUMMARY OF THE INVENTION

This invention provides compositions of matter that contain an electron emitting substance and an expansion material. The expansion material may, for example, be an intercalation compound. When a film is formed from the composition, expansion of the expansion material typically causes rupturing or fracturing of the film. After expansion of the expansion material, no further treatment of the surface of the film is typically required to render the film useful as a field emitter. A conductor formed from such a fractured film acts as an efficient electron field emitter and thus is useful in vacuum microelectronic devices. Other embodiments of the invention are consequently an electron emitting film that has been ruptured or fractured, and a process for fabricating an electron field emitter by expanding an expansion material in a film from which the field emitter has been prepared.

In a preferred embodiment, this invention provides compositions of matter for field emission that include acicular carbon and an expansion material, wherein the expansion material expands during heat treatment and provides sufficient force to rupture or rearrange an electron emitting film made from the composition.

Carbon nanotubes are the preferred acicular carbon. Single wall carbon nanotubes are more preferred, and single wall carbon nanotubes grown by laser ablation or irradiation are especially preferred. Preferred for use in this process is an electron field emitter prepared from a composition in which the electron emitting substance is about 0.1 to about 20 wt % of the total weight of the composition, and, alternatively, may be less than about 9 wt % of the total weight of the composition. More preferred is an electron field emitter prepared from a composition in which the electron emitting substance is less than about 5 wt % of the total weight of the composition. Still more preferred is an electron field emitter prepared from a composition in which the electron emitting substance is less than about 1 wt % of the total weight of the composition. Most preferred is an electron field emitter prepared from a composition in which the electron emitting substance is about 0.01 wt % to about 2 wt % of the total weight of the composition.

The preferred expansion material is graphite particles which are intercalated and expand in volume when heated. Other intercalation compounds such as clays and micas may also serve this role. Expansion materials, such as the graphite particles, are added from 1 wt % to 99 wt % of the total solids weight of the composition containing an electron emitting substance. Other materials such as silver particles, glass particles and organic vehicles may be added to the formulation in order to add printability, conductivity or insulation to the composition.

The composition may be prepared as a screen printable paste, containing among the solids an electron emitting substance such as carbon nanotubes, wherein the electron emitting substance is about 0.1 to about 20 wt % of the total weight of the solids in the paste, but may be less than 9 wt % of the total weight of the solids in the paste. More preferred is a composition wherein the electron emitting substance is less than 5 wt % of the total weight of the solids in the paste. Still more preferred is a composition wherein the electron emitting substance is less than 1 wt % of the total weight of the solids in the paste. Most preferred is a composition wherein the electron emitting substance is about 0.01 wt % to about 2 wt % of the total weight of the solids in the paste. This paste is especially useful in fabricating an electron field emitter by the process of the invention. Such an emitter has excellent emission properties, good adhesion to a substrate along with the advantages of ease of preparing and comparatively low cost of materials and processing.

The improved electron field emitters of this invention are fabricated from the compositions of this invention, and are useful in flat panel computer, television and other types of displays, vacuum electronic devices, emission gate amplifiers, klystrons and in lighting devices. The compositions of matter and process hereof are especially advantageous for producing large area electron field emitters for flat panel displays, i.e. for displays greater than 30 inches (76 cm) in size. The flat panel displays can be planar or curved.

Another embodiment of this invention is a composition of matter containing (a) an electron emitting substance, and (b) an expansion material, the volume of which is expandable by a factor of at least about 1.03 times.

A further embodiment of this invention is a composition of matter (a) an electron emitting substance, and (b) an intercalation compound.

Yet another embodiment of this invention is an electron emitting film containing (a) an electron emitting substance, and (b) an expansion material, wherein the electron emitting film has been ruptured by expansion of the expansion material.

Yet another embodiment of this invention is a process for fabricating an electron emitting film by (a) forming an electron emitting film from a composition that contains (i) an electron emitting substance, and (ii) an expansion material, the volume of which is expandable by a factor of at least about 1.03 times; and (b) expanding the expansion material.

DETAILED DESCRIPTION OF THE INVENTION

Figure 1:
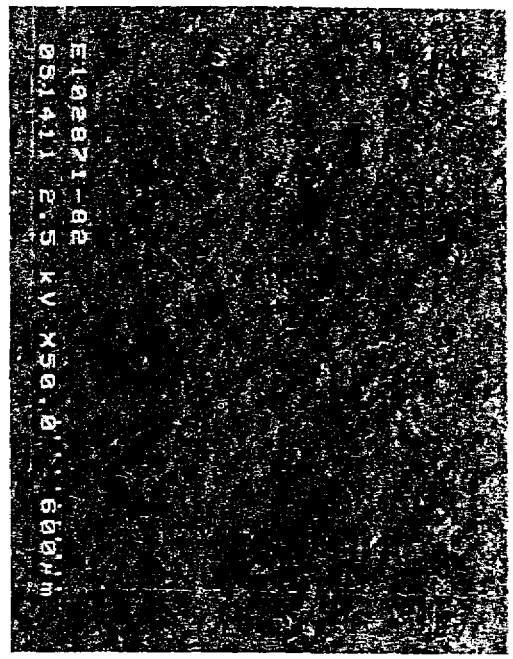
FIG. 1 shows the surface microstructure of a composition of this invention before and after heat treatment.
Figure 1:
Figure 1:
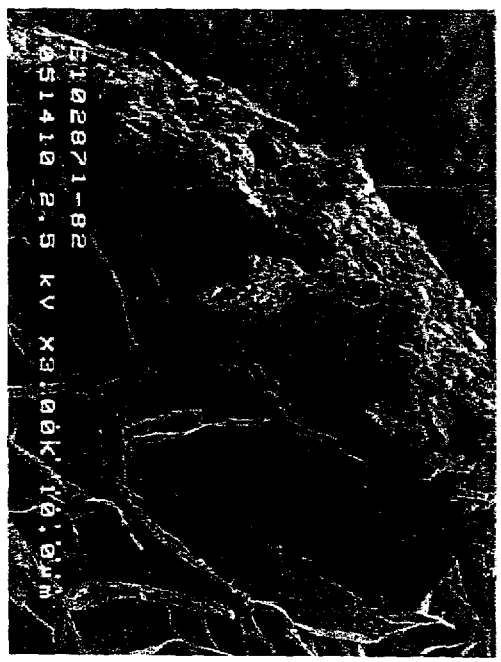

This invention provides a composition of matter with improved field emission that contain an electron emitting substance and an expansion material. The composition may be used for the fabrication of an electron field emitter. This composition may contain, in addition to an electron emitting substance and an expansion material, glass frits, metallic powder or metallic paint, or a mixture thereof, as may be desired for assistance in attachment of the electron field emitter to a substrate. As a result, the total weight of the composition from which the electron field emitter may be fabricated does include the weight of materials such as glass frits, metallic powder or metallic paint, but does not include the weight of the substrate that supports the electron field emitter.

The composition herein is especially effective when the electron emitting substance is an acicular emitting substance, e.g., carbon, a semiconductor, metal or mixtures thereof. An acicular substance is elongated and contains particles with aspect ratios of 10 or more. Acicular carbon can be of various types. Carbon nanotubes are the preferred acicular carbon, and single wall carbon nanotubes are especially preferred. The individual single wall carbon nanotubes are extremely small, typically about 1.5 nm in diameter. The carbon nanotubes are sometimes described as graphite-like, presumably because of the $sp^2$ hybridized carbon. The wall of a single wall carbon nanotube can be envisioned as a cylinder formed by rolling up a graphene sheet. Multiwall nanotubes have cylindrical walls of more than one graphene sheet, and may also be used in the invention.

Carbon fibers grown from the catalytic decomposition of carbon-containing gases over small metal particles are also useful as the acicular carbon. A catalytically grown carbon fiber is a carbon fiber grown from the catalytic decomposition of carbon-containing gases over small metal particles, and has graphene platelets arranged at an angle with respect to the fiber axis so that the periphery of the carbon fiber consists essentially of the edges of the graphene platelets. The angle may be 90°, or may be an acute angle with respect to the perpendicular to the fiber axis.

Other examples of acicular carbon are polyacrylonitrile-based (PAN-based) carbon fibers and pitch-based carbon fibers.

The expansion material may be an intercalation compound such as intercalated graphite, mica, clay or vermiculite. An intercalation compound is a chemical compound in which a crystalline substance incorporates molecules, atoms or ions of another substance in gaps or layers of its crystal lattice. The crystalline lattice acts as an electron donor, and "foreign" electron acceptor atoms are interspersed or diffused between the planes of the lattice. Graphite is particularly susceptible to this phenomenon because of its orderly stacked layers of crystals. The volume of the expansion material is expandable by a factor of about 1.03 to about 200 times, and preferably the volume of the expansion material is expandable by a factor of at least about 1.03 times. Usually this expansion in volume is caused by a treatment such as heat treating. In an alternative embodiment, the expansion material may be a foamable material. The expansion material may be used in a composition of this invention in an amount of about 1 wt % to about 99 wt %, based on the total weight of the composition, preferably in an amount of about 2 wt % to about 30 wt %, and more preferably in an amount of about 5 wt % to about 20 wt %.

When the composition of this invention is used to prepare an electron field emitter, various processes can be used to attach the composition to a substrate. As the electron field emitter thus prepared will be incorporated into an apparatus such as a field emitter cathode, the attachment between the composition and the substrate must withstand and maintain its integrity under the conditions of manufacturing and the conditions of usage of such apparatus. Those conditions are typically vacuum conditions and temperatures up to about 450° C. As a result, organic materials are not generally applicable for attaching an electron field emitter to a substrate, and the poor adhesion of many inorganic materials to carbon further limits the choice of materials that can be used. A preferred method of attachment is to screen print the composition in the form of a paste, optionally containing glass frits, metallic powder or metallic paint or a mixture thereof, onto a substrate in the desired pattern and to then fire the dried patterned paste. For a wider variety of applications, e.g., those requiring finer resolution, the preferred process involves screen printing a paste that contains a photoinitiator and a photohardenable monomer, photopatterning the dried paste and firing the patterned paste.

The substrate can be any material to which a paste composition will adhere. If the paste is non-conducting and a non-conducting substrate is used, a film of an electrical conductor to serve as the cathode electrode, and to provide means to apply a voltage to and supply electrons to the electron emitting substance, will be needed. Silicon, a glass, a metal or a refractory material such as alumina can serve as the substrate. For display applications, the preferable substrate is glass, and soda lime glass is especially preferred. For optimum conductivity on glass, silver paste can be pre-fired onto the glass at 500–550° C. in air or nitrogen, but preferably in air. The conducting layer so-formed can then be over-printed with the composition in paste form.

The paste used for screen printing contains an expansion material, an electron emitting substance, such as acicular carbon. It frequently also contains an organic medium, a solvent, a surfactant, a low-softening-point glass frit, a metallic powder and/or a metallic paint, or a mixture of any of same. The role of the organic medium and solvent is to suspend and disperse the particulate constituents, i.e. the solids, in the paste with a proper rheology for typical patterning processes such as screen printing. There are many such organic media known in the art. Examples of resins that can be used for such purpose are cellulosic resins such as ethyl cellulose and alkyd resins of various molecular weights. Butyl carbitol, butyl carbitol acetate, dibutyl carbitol, dibutyl phthalate and terpineol are examples of useful solvents. These and other solvents are formulated to obtain the desired viscosity and volatility requirements in the composition. A surfactant can be used to improve the dispersion of the particles. Organic acids such oleic and stearic acids and organic phosphates such as lecithin or Gafac® phosphates are typical surfactants.

A glass frit that softens sufficiently at the firing temperature to adhere to the substrate and to the electron emitting substance is typically used. Lead or bismuth glass frits can be used, as well as other glasses with low softening points, such as calcium or zinc borosilicates. Within this class of glasses, the specific composition is generally not critical. If a screen printable composition with higher electrical conductivity is desired, the paste typically also contains a conductive metal, for example, silver or gold. The paste typically contains about 40 wt % to about 80 wt % solids based on the total weight of the paste. These solids comprise the electron emitting substance, together with glass frits and/or metallic components, as desired. Variations in the composition can be used to adjust the viscosity and the final thickness of the printed material.

The emitter paste is typically prepared by three-roll milling a mixture of the electron emitting substance, the expansion material, and, as needed, an organic medium, a surfactant, a solvent, a low-softening-point glass frit, a metallic powder, and/or a metallic paint, or a mixture thereof. The paste mixture can be screen printed using well-known screen printing techniques, e.g. by using a 165–400-mesh stainless steel screen. The paste can be deposited as a continuous film or in the form of a desired pattern. When the substrate is glass, the paste is then fired at a temperature of about 350° C. to about 550° C., preferably at about 450° C. to about 525° C., for about 10 minutes in nitrogen. Higher firing temperatures can be used with substrates which can endure them provided the atmosphere is free of oxygen. However, the organic constituents in the paste are effectively volatilized at 350–450° C., leaving the layer of composite comprised of the electron emitting substance and other components such as glass frit and/or metallic conductor.

If the screen-printed paste is to be photopatterned, the paste may contain a photoinitiator, a developable binder and/or a photohardenable monomer, such as at least one addition polymerizable ethylenically unsaturated compound having at least one polymerizable ethylenic group.

A preferred composition for use as a screen printable paste is one containing solids that include an electron emitting substance, such as carbon nanotubes, wherein the electron emitting substance is less than 9 wt % of the total weight of solids in the paste. More preferred is a composition wherein the electron emitting substance is less than 5 wt % of the total weight of solids in the paste. Still more preferred is a composition wherein the electron emitting substance is less than 1 wt % of the total weight of solids in the paste. Most preferred is a composition wherein the electron emitting substance is about 0.01 wt % to about 2 wt % of the total weight of solids in the paste.

The paste described above is especially useful in fabricating an electron field emitter by the process of the invention. Compositions with a low concentration of electron emitting substance provide an excellent electron field emitter when fabricated by the process of this invention. As a typical example, a paste containing an electron emitting substance, an expansion material, glass frit and silver will contain about 0.01 to about 6.0 wt % electron emitting substance, about 5 to about 10 wt % expansion material, about 3 to about 15 wt % glass frit, and about 40 to about 75 wt % silver in the form of fine silver particles, based on the total weight of the paste.

The compositions of this invention are useful for the fabrication of an electron field emitter having improved field emission properties, and they include an electron emitting substance, such as acicular carbon, an acicular semiconductor, an acicular metal, or mixtures thereof, in addition to an expansion material. An electron field emitter is fabricated from an electron emitting film that is in turn prepared from a composition of this invention. In the process of this invention, a treatment, such as a heat treatment, is applied to an electron emitting film. Upon the application of the treatment, the expansion material expands and produces sufficient displacement and force to rupture or rearrange a portion of the field emitting film, thereby forming a new surface of the field emitting film. In FIG. 1, the surface of a film before an after expansion of an expansion material is shown. The surface before expansion is shown in FIG. 1a (50× magnification), and the surface after expansion is shown in FIGS. 1b (500× magnification) and 1c (3000× magnification). FIGS. 1b and 1c show ruptures in the surface of the film. In this ruptured or fractured condition, the field emitting film has improved field emission performance as compared to a film that has not been ruptured or fractured. It is believed that the newly formed surface of the field emitting film has electron emitting particles, such as acicular particles, protruding from it.

Electron field emitters will have improved emission properties by virtue of incorporating a film that has been subjected to the process of this invention. The process of this invention is thus not only a process for fabricating an electron emitting film, but is also a process for fabricating an electron field emitter because the film may be included in the field emitter. The improved electron field emitters of this invention can be used in the cathodes of electronic devices such as field emission triodes and in particular in field emission display devices. Such a display device contains (a) a cathode using an electron field emitter improved by the process of this invention, (b) a patterned optically transparent electrically conductive film serving as an anode and spaced apart from the cathode, (c) a phosphor layer capable of emitting light upon bombardment by electrons emitted by the electron field emitter and positioned adjacent to the anode and between the anode and the cathode, and (d) one or more gate electrodes disposed between the phosphor layer and the cathode. The use of the compositions of this invention to fabricate an electron field emitter is readily adapted to large size electron field emitters that can be used in the cathodes of large size display panels.

Use of the compositions of this invention for fabricating an electron field emitter is conducive to fabricating completely screen-printed triodes. Expansion of the expanding material in the electron emitting film of the electron field emitter can occur immediately after it is screen printed and fired or, preferably, after any dielectric materials and gate electrodes have been screen printed onto the cathode and fired.

The accuracy and resolution attained with screen printing are limited. Therefore, it is difficult to fabricate a triode with dimensions less than 100 μm. Preventing electrical shorting between the gate and emitter layers is difficult due to printing inaccuracy. In addition, since the features on each layer must be printed one layer at a time, repeated repositioning of different screens further degrades registration. In order to prevent shorting, the gate layer opening is often enlarged relative to the dielectric via and this significantly degrades the effectiveness of the gate-switching field due to increased gate to emitter distance.

A photoimagable thick film approach can solve all of the aforementioned problems and is useful for forming an array of normal gate triodes as well as for forming an array of inverted-gate triodes. A normal gate triode has the gate electrode physically between the field emitter cathode and the anode. An inverted-gate triode has the field emitter cathode physically between the gate and the anode. Photoimagable thick film formulations such as the Fodel® silver and dielectric paste compositions (DC206 and DG201 respectively) are available from E. I. du Pont de Nemours and Company, Wilmington, Del. They contain silver or dielectric in the form of fine particles and a small amount of low melting glass frit in an organic medium containing photoimagable ingredients such as photoinitiator and photomonomers. Typically, a uniform layer of Fodel® paste is screen printed on a substrate with controlled thickness. The layer is baked in low heat to dry. A contact photo-mask with the desired pattern is placed in intimate contact with the film and exposed to ultra-violet (UV) radiation. The film is then developed in weak aqueous sodium carbonate. Feature dimensions as small as 10 μm can be produced by photoimaging these screen-printed thick films. Therefore, triode dimensions as small as 25 μm may be achieved.

In addition, imaging can be carried out in multi-layers thus eliminating alignment accuracy problems. This is advantageous in the fabrication of the normal gate triode since the silver gate and dielectric layers can be imaged together to achieve perfect alignment between the gate and dielectric openings and in the fabrication of the inverted gate triode since the emitter, silver cathode, and dielectric layers can be imaged together to achieve perfect capping of the dielectric ribs while avoiding short formation.

Use of the compositions of this invention for fabricating an electron field emitter is also conducive to fabricating a lighting device. Such a device comprises (a) a cathode using an electron field emitter that has been fabricated by the process of the invention, and (b) an optically transparent electrically conductive film serving as an anode and spaced apart from the cathode, and (c) a phosphor layer capable of emitting light upon bombardment by electrons emitted by the electron field emitter and positioned adjacent to the anode and between the anode and the cathode. The cathode may consist of an electron field emitter in the form of a square, rectangle, circle, ellipse or any other desirable shape with the electron field emitter uniformly distributed within the shape or the electron field emitter may be patterned. Although screen printing is a convenient method for forming the electron field emitter, other patterning techniques such as ink jets, stenciling or contact printing may be used. Use of the compositions of this invention for fabricating an electron field emitter is also conducive to fabricating a vacuum electronic device.

The advantageous effects of this invention are demonstrated by a series of examples, as described below. The embodiments of the invention on which the examples are based are illustrative only, and do not limit the scope of the invention. The significance of the examples (Examples 1 and 2) is better understood by comparing these embodiments of the invention with a controlled formulation (Control A), which does not possess the distinguishing features of this invention.

Electron field emitters were fabricated for use as samples from the compositions of this invention and by the process of this invention. Field emission tests were carried out on the resulting samples using a flat-plate emission measurement unit comprised of two electrodes, one serving as the anode or collector and the other serving as the cathode. The cathode consists of a copper block mounted in a polytetrafluoroethylene (PTFE) holder. The copper block is recessed in a 1 inch by 1 inch (2.5 cm×2.5 cm) area of PTFE and the sample substrate is mounted to the copper block with electrical contact being made between the copper block and the sample substrate by means of copper tape. A high voltage lead is attached to the copper block. The anode is held parallel to the sample at a distance, which can be varied, but once chosen it was held fixed for a given set of measurements on a sample. Unless stated otherwise a spacing of 1.25 mm was used. The anode consists of a glass plate coated with indium tin oxide deposited by chemical vapor deposition. It is then coated with a standard ZnS-based phosphor, Phosphor P-31, Type 139 obtained from Electronic Space Products International. An electrode is attached to the indium tin oxide coating.

The test apparatus is inserted into a vacuum system, and the system was evacuated to a base pressure below $1\times10^{-5}$ torr ($1.3\times10^{-3}$ Pa). A negative voltage pulse with typical pulse width of 3 µsec at a frequency of 60 Hz is applied to the cathode and the average emission current was measured as a function of the applied voltage.

EXAMPLE 1

This demonstrates the good emission exhibited by an electron field emitter fabricated from a composition of, and by the process of, this invention.

The emitter paste was prepared by mixing three components: one a suspension containing single wall carbon nanotubes, one a typical organic medium containing 10% ethylcellulose and 90% beta-terpineol, and one a typical paste containing silver. Laser ablation grown single wall carbon nanotubes were obtained from Tubes @ Rice, Rice University, Houston, Tex. as an unpurified powder produced by laser ablation. A nanotube suspension was prepared by sonicating, i.e. by mixing ultrasonically, a mixture containing 1% by weight of the nanotube powder and 99% by weight of trimethylbenzene. The ultrasonic mixer used was a Dukane Model 92196 with a ¼ inch diameter horn operating at 40 kHz and 20 watts. The silver paste was a silver paste composition 7095 available from E. I. du Pont de Nemours and Company, Wilmington, Del. containing 65.2 wt % silver in the form of fine silver particles and a small amount of glass frit in an organic medium.

Grafguard 160–150B expandable graphite flake was obtained from Graftech Inc., Cleveland, Ohio, as an expansion material. 0.28 grams of Grafguard flake was heated in air at 250° C. for 10 minutes and then added to 4 grams of the paste containing carbon nanotubes described above. The combination was mixed in a three-roll mill for ten passes to form the emitter paste. A 2 cm² square pattern of emitter paste was then screen printed onto the pre-fired silvered glass substrate using a 200 mesh screen and the sample was subsequently dried at 125° C. for 10 minutes. The dried sample was then fired in air for 1 minute at 350° C. After firing the thick film composite forms an adherent coating on the substrate. The expandable graphite disrupts the film in local areas.

Figure 2:
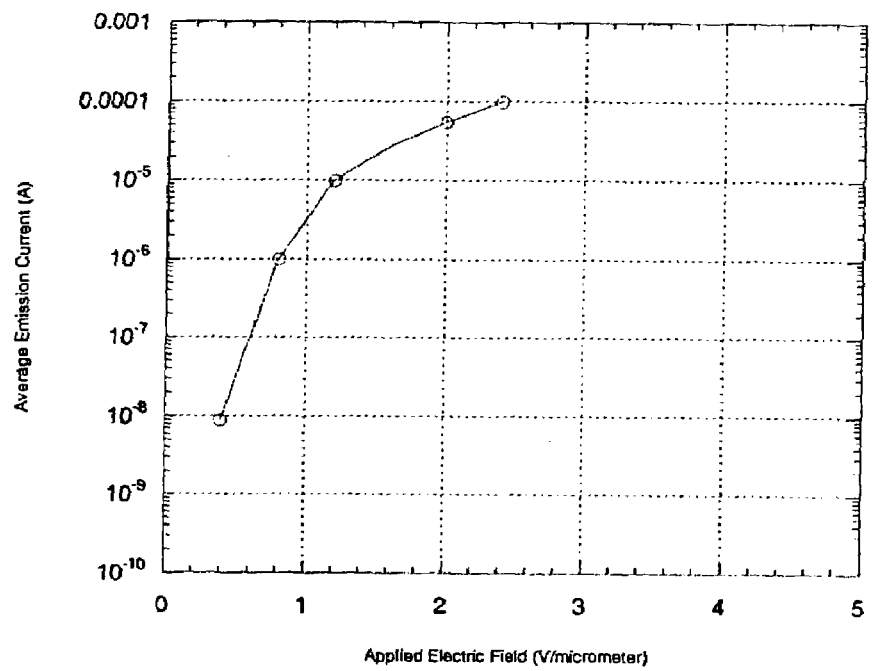
FIG. 2 shows the I–V curve after a film fabricated from a composition of this invention (Example 1) has been heat treated.

This electron field emitter was tested for field emission as described in the specification. FIG. 2 shows the emission results for the electron field emitter of Example 1 with emission current plotted as a function of applied electric field.

Control A: This demonstrates the poor emission exhibited by an electron field emitter containing single wall carbon nanotubes combined with a particulate material that does not expand within the film formed from the composition in which the carbon nanotubes are contained.

The emitter paste was prepared by mixing three components: one a suspension containing single wall carbon nanotubes, one a typical organic medium containing 10% ethylcellulose and 90% beta-terpineol, and one a typical paste containing silver. Laser ablation grown single wall carbon nanotubes were obtained from Tubes @ Rice, Rice University, Houston, Tex. as an unpurified powder produced by laser ablation. A nanotube suspension was prepared by sonicating, i.e. by mixing ultrasonically, a mixture containing 1% by weight of the nanotube powder and 99% by weight of trimethylbenzene. The ultrasonic mixer used was a Dukane Model 92196 with a ¼ inch diameter horn operating at 40 kHz and 20 watts. The silver paste was a silver paste composition 7095 available from E. I. du Pont de Nemours and Company, Wilmington, Del. containing 65.2 wt % silver in the form of fine silver particles and a small amount of glass frit in an organic medium.

0.28 grams of SiC platelets obtained from Third Millenium Technologies Inc., Knoxville, Tenn. were added to 4 grams of the paste containing carbon nanotubes described above. The particle size is very similar to the size of the graphite particles added in Example 1. The combination was mixed in a three-roll mill for ten passes to form the emitter paste. A 2 cm² square pattern of emitter paste was then screen printed onto the pre-fired silvered glass substrate using a 325 mesh screen and the sample was subsequently dried at 120° C. for 10 minutes. The dried sample was then fired in nitrogen for 10 minutes at 450° C. After firing the nanotube paste forms an adherent coating on the substrate. In this case there is no disruption of the nanotube containing film.

Figure 3:
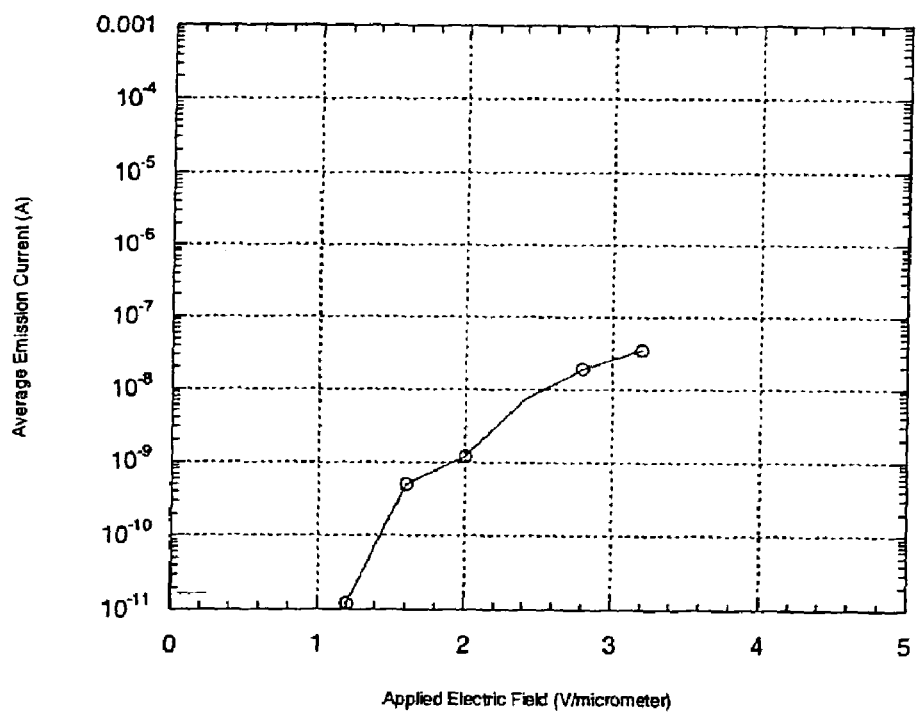
FIG. 3 shows the I–V curve after a film fabricated from a composition not described by this invention (Control A) has been heat treated.
Figure 4:
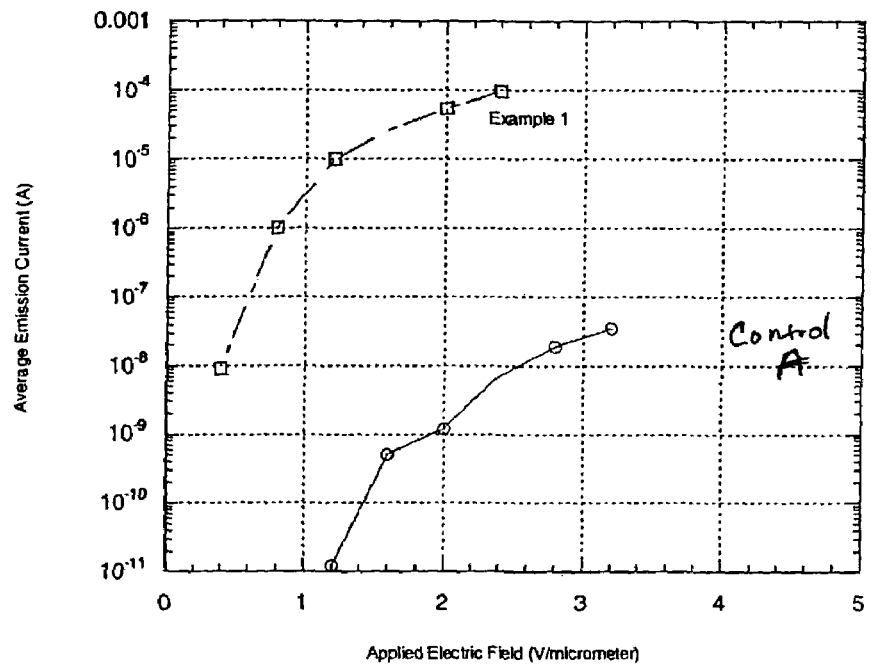
FIG. 4 shows a comparison of the I–V curves of Example 1 and Control A.

This electron field emitter was tested for field emission as described in the specification. FIG. 3 shows the emission results for the electron field emitter of Control A with emission current density plotted as a function of applied electric field. FIG. 4 compares the emission results from Example 1 and Control A. Note that, as compared to Control A, Example 1 shows much higher emission current, which is indicative of commercial usefulness.

EXAMPLE 2

This demonstrates the good emission exhibited by an electron field emitter fabricated from a composition of, and by the process of, this invention.

The emitter paste was prepared by mixing three components: one a suspension containing single wall carbon nanotubes, one a typical organic medium containing 10% ethylcellulose and 90% beta-terpineol, and one a typical paste containing silver. Hipco™ process single wall carbon nanotubes were obtained from Carbon Nanotechnologies Inc., Houston, Tex. as an unpurified powder produced by catalytic decomposition of carbon monoxide. A nanotube suspension was prepared by sonicating, i.e. by mixing ultrasonically, a mixture containing 1% by weight of the nanotube powder and 99% by weight of trimethylbenzene. The ultrasonic mixer used was a Dukane Model 92196 with a ¼ inch diameter horn operating at 40 kHz and 20 watts. The silver paste was a silver paste composition 7095 available from E. I. du Pont de Nemours and Company, Wilmington, Del. containing 65.2 wt % silver in the form of fine silver particles and a small amount of glass frit in an organic medium.

Grafguard 160–150B expandable graphite flake was obtained from Graftech Inc., Cleveland, Ohio. 0.28 grams of Grafguard flake was heated in air at 250° C. for 10 minutes and then added to 4 grams of the paste containing carbon nanotubes described above. The combination was mixed in a three-roll mill for ten passes to form the emitter paste. A 2 cm$^2$ square pattern of emitter paste was then screen printed onto the pre-fired silvered glass substrate using a 200 mesh screen and the sample was subsequently dried at 125° C. for 10 minutes. The dried sample was then fired in air for 1 minute at 350° C. After firing the thick film composite forms an adherent coating on the substrate. The expandable graphite disrupts the film in local areas.

Figure 5:
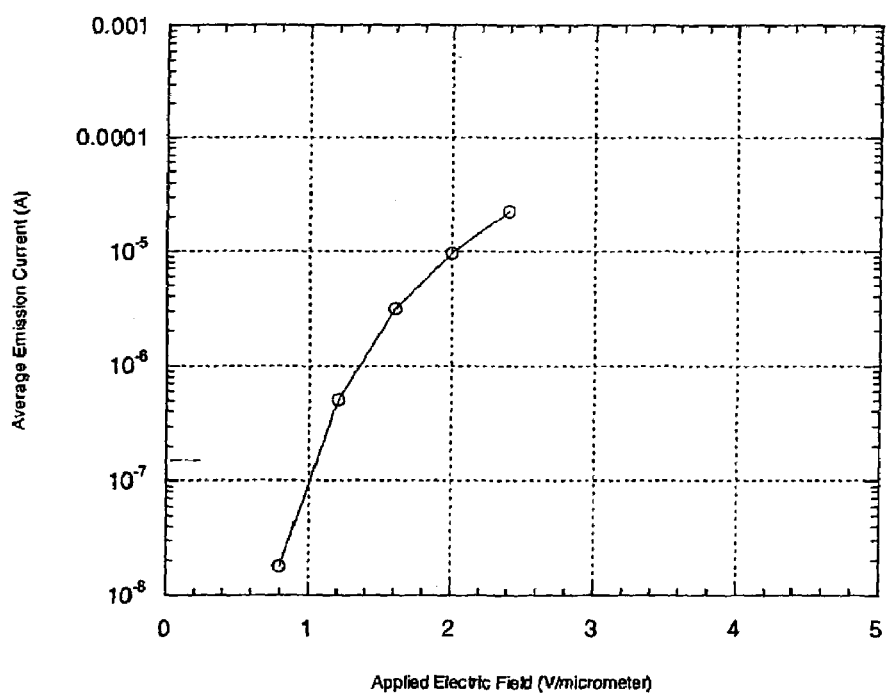
FIG. 5 shows the I–V curve after a film fabricated from a composition of this invention (Example 2) has been heat treated.

This electron field emitter was tested for field emission as described in the specification. FIG. 5 shows the emission results for the electron field emitter with emission current plotted as a function of applied electric field. Note that the results are similar to Example 1, that is, good emission.

What is claimed is:

1. A composition of matter comprising (a) an acicular electron emitting substance as a first material, and (b) an expansion material as a second material, the volume of which is expandable by a factor of at least about 1.03 times, wherein the expansion material is a graphite, clay or vermiculite.

2. A composition according to claim 1 wherein the volume of the expansion material is expandable by a factor of about 1.03 to about 200 times.

3. A composition according to claim 1 wherein the electron emitting substance is acicular carbon.

4. A composition according to claim 1 wherein the electron emitting substance is a carbon nanotube.

5. A composition according to claim 4 wherein the carbon nanotubes comprise one or both of single-wall carbon nanotubes and multi-wall carbon nanotubes.

6. A composition according to claim 1 wherein the content of the electron emitting substance is about 0.1 to about 20 weight percent, based on the total weight of the composition.

7. A composition according to claim 1 further comprising a conductive metal.

8. A composition according to claim 1 further comprising one or more of a photoinitiator, a developable binder and a photohardenable monomer.

9. A composition according to claim 1 in the form of a printable paste.

10. A composition according to claim 1 in the form of an electron emitting film.

11. An electron emitting film comprising (a) an electron emitting substance as a first material, and (b) an expansion material as a second material, wherein the electron emitting film has been ruptured by expansion of the expansion material, and wherein the expansion material is an intercalated graphite, clay or vermiculite.

12. An electron emitting film according to claim 11 wherein the electron emitting substance is carbon nanotube.

13. A film according to claim 12 wherein the carbon nanotubes comprise one or both of single-wall carbon nanotubes and multi-wall carbon nanotubes.

14. An electron emitting film according to claim 11 further comprising a conductive metal.

15. An electron emitting film according to claim 11 further comprising one or more of a photoinitiator, a developable binder and a photohardenable monomer.

16. A field emission triode, a field emission display, a lighting device, or a vacuum electronic device comprising an electron emitting film according to claim 11.

17. A process for fabricating an electron emitting film, comprising
(a) forming an electron emitting film from a composition that comprises (i) an electron emitting substance as a first material, and (ii) an expansion material as a second material, the volume of which is expandable by a factor of at least about 1.03 times, wherein the expansion material is an intercalated graphite, clay or vermiculite; and
(b) expanding the expansion material.

18. A process according to claim 17 wherein the volume of the expansion material is expandable by a factor of about 1.03 to about 200 times.

19. A process according to claim 17 wherein the expansion material is expanded by heating.

20. A process according to claim 17 wherein the step of expanding the expansion material comprises a step of rupturing the film.

21. A process according to claim 17 wherein the step of forming an electron emitting film comprises screen printing a paste prepared from the composition of the electron emitting substance and the expansion material.

22. A process according to claim 17 further comprising a step of providing the electron emitting substance by growth train the catalytical decomposition of carbon-containing gases over small metal particles.

23. A process according to claim 17 further comprising a step of providing the electron emitting substance by laser irradiation.

24. A process according to claim 17 wherein the electron emitting substance is a carbon nanotube.

25. A process according to claim 24 wherein the carbon nanotubes comprise one or both of single-wall carbon nanotubes and multi-wall carbon nanotubes.

26. A process according to claim 17 further comprising a step of incorporating the electron field emitting film into the cathode of an electronic device.

* * * * *